Figure 4:
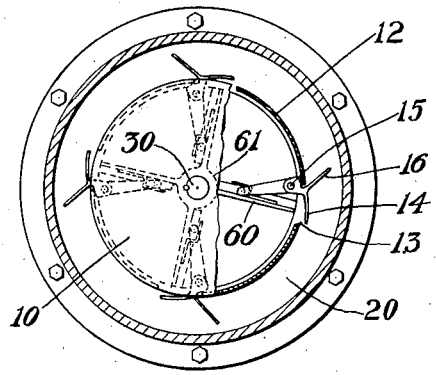

Aug. 7, 1928.
E. G. BAILEY
1,679,557
APPARATUS FOR FEEDING AND METERING PULVERULENT OR GRANULAR MATERIALS
Original Filed Aug. 31, 1921   3 Sheets-Sheet 1
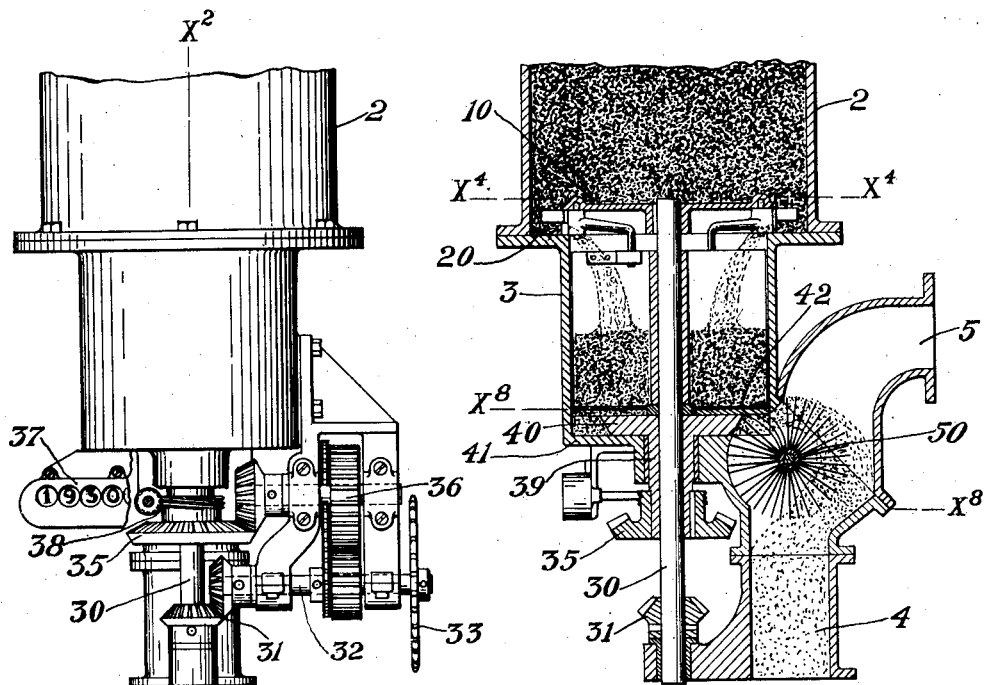
Fig. 1
Fig. 2
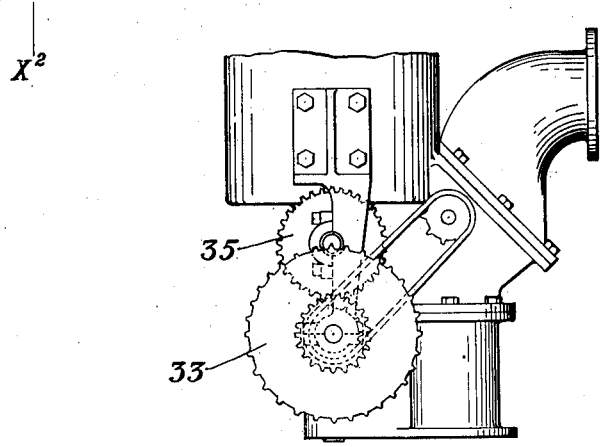
Fig. 3
INVENTOR
Ervin G. Bailey
BY Joseph P. Livermore
ATTORNEY Aug. 7, 1928.

E. G. BAILEY 1,679,557

APPARATUS FOR FEEDING AND METERING PULVERULENT OR GRANULAR MATERIALS

Original Filed Aug. 31, 1921    3 Sheets-Sheet 2

INVENTOR
Ervin G. Bailey
BY
Joseph P. Livermore
ATTORNEY

Patented Aug. 7, 1928.

1,679,557

UNITED STATES PATENT OFFICE.

ERVIN G. BAILEY, OF CLEVELAND HEIGHTS, OHIO, ASSIGNOR, BY MESNE ASSIGNMENTS, TO FULLER LEHIGH COMPANY, A CORPORATION OF DELAWARE.

APPARATUS FOR FEEDING AND METERING PULVERULENT OR GRANULAR MATERIALS.

Application filed August 31, 1921, Serial No. 497,442. Renewed May 13, 1927.

This invention relates to an apparatus for feeding, and also for metering when desired, pulverulent, granular, or any finely divided material, such for example as powdered coal, or flour, or sand. The apparatus forming the subject of this invention is eminently useful for feeding pulverized coal to furnaces, and for metering or keeping an account of the weight of the coal passed through the apparatus.

The device for effecting the final discharge, may serve as a metering appliance to measure and keep an account of the bulk of the material which is passed, and an important feature of the invention comprises appliances by which the material is brought to substantially uniform condition as to density before being acted upon by the said discharging device, so that the bulk delivery rate, substantially determines also the weight which has passed, and which may thus be kept account of by the metering device.

The apparatus comprises among its principal components a primary feeding appliance which takes the material from a suitable reservoir or source of supply and is provided with variable feeding devices shown in this instance as movable blades which are automatically controlled so as to take the material more or less rapidly from the supply as circumstances require.

The said primary feeding device delivers into an intermediate chamber, or accumulator, as it will be called, in such manner as to accumulate a certain amount at standard density at the delivery point, and from the accumulator the material is delivered at the desired rate by a discharging appliance which also may serve as a measuring device, or meter, the rate of operation of which may be kept account of in any suitable or usual way, as by a train of counting wheels to keep account of the extent of movement of the metering device.

The variable feeding devices of the primary feeder are controlled by a device, which will be called the controller, which is responsive to the material at any time contained in the accumulator so to regulate the primary feed in such manner as to retain the accumulated material at approximately uniform density.

The apparatus herein shown as an embodiment of the invention is adapted for feeding pulverized coal, which will be referred to as the material operated on in the following description, although the apparatus forming the subject of the invention may be used for other materials such for example as flour, or even granular material such as sand or granular ore, and such modification as may be required will usually be in the way of simplification or omission of some of the devices which form a part of the coal feeding apparatus which will now be described.

Figure 8:
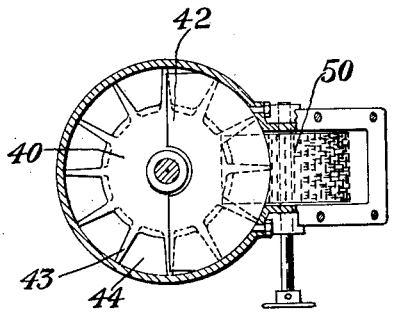
Figure 5:
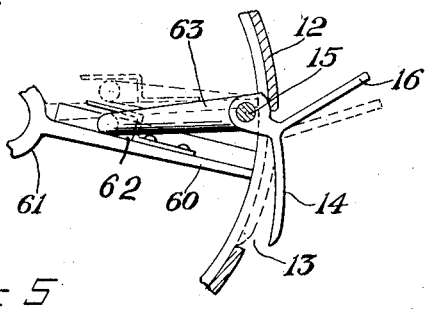
Figure 7:
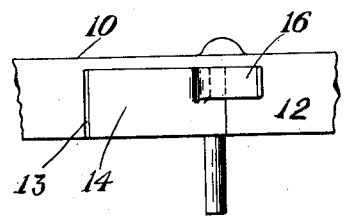
Figure 6:
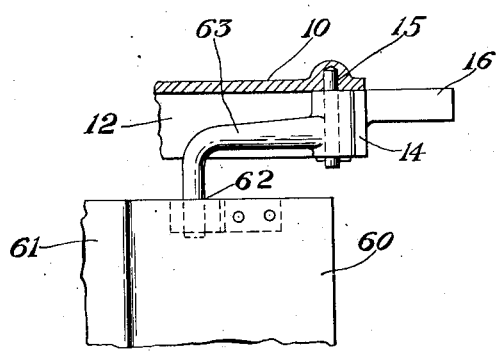
Figure 9:
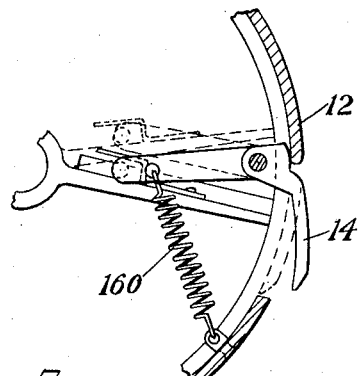
Figure 10:
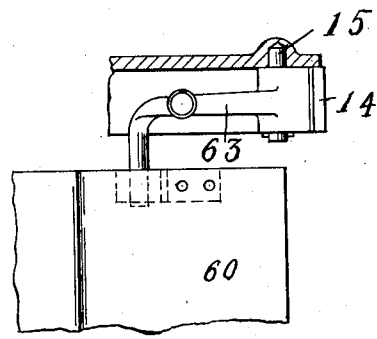
Figure 11:
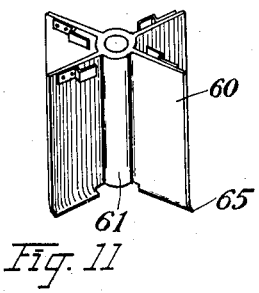

Fig. 1 is a side elevation of a feeding and metering apparatus embodying this invention;

Fig. 2 a vertical section thereof on line $X^2$ Fig. 1;

Fig. 3 an elevation of the lower portion of the apparatus on a plane at right angles to that of Fig. 1;

Fig. 4 a sectional plan on line $X^4$ of Fig. 2, showing one form of variable feeding devices of the primary feeder, and the means for regulating their action;

Figs. 5, 6, and 7 details showing one of the variable feeding devices and a portion of the means for controlling its operation;

Fig. 8 a section on line $X^8$ of Fig. 2 showing the discharging and measuring device in plan view;

Figs. 9 and 10 details showing a modified construction of the variable feeding device of the primary feeder; and Fig. 11 a perspective view of the controller by which the action of the primary feeding device is automatically governed.

Referring to Fig. 2 the pulverized coal is taken from a reservoir 2, or main source of supply, from which it is delivered by the primary feeding appliances into an intermediate chamber or accumulator 3 from which it is taken at the desired rate and discharged into a delivery duct 4, which may lead to the furnaces where the coal is to be consumed, and through which a current of air entering through the air inlet 5, may flow, the coal being delivered into said air current in a fully separated condition so that the particles are thoroughly distributed in the current of air flowing to the furnace.

Before describing in detail the construction of the feeding and discharging devices above referred to, the character of the material and the problem involved in handling the same properly will be first briefly stated.

The finely powdered material such as coal varies widely in density according to its condition.

If loosened up and piled not very deep, it may have not much more than half the density that the same material would have if packed by jarring or tamping and accumulated in a higher column so as to be under considerable pressure.

Futhermore, when thus compacted, the particles are likely to cohere more or less and form lumps of greater or less size and firmness so that more or less agitation or attrition is required to break them up, so that the particles will be fully separated and adapted to be distributed throughout a current of air as is required for the proper feed of the furnace.

If, however, the material in its fine and separated condition is allowed to accumulate by gravitation to a definite depth or head, it will acquire very closely a definite density so that a bulk measurement will serve satisfactorily as a basis for measurement or computation of the weight.

The primary feeding appliance of the present apparatus is devised to discharge the powdery material from the reservoir 2, in a fully separated, uniform condition into the accumulator 3 in which it collects, and which it would fill if it were not at the same time being discharged from the said chamber by the discharging and measuring device.

Said primary feeder, furthermore, is automatically controlled, as will be described later, so that when the material has collected in the accumulator to a predetermined depth, giving the desired density at the bottom, the primary feed is maintained substantially equal to the discharge, which thus takes place while acting upon the material in a condition of substantially uniform density.

The primary feeder is best shown in Fig. 2, and Figs. 4–7 inclusive, and comprises a drumlike head 10 which substantially covers the upper end of the accumulator 3, there being a floor 20 for the reservoir 2 surrounding the upper end of the accumulator 3, and, with the drum 10, forming the bottom of the reservoir upon which the pulverized material is supplied in an indefinite amount.

The head or disc-like end of the drum 10 is a short distance above the floor 20 and the side wall 12 of said drum (see Figs. 4–7) is provided with a number of openings 13 in which are located the variable feeding devices shown as blades 14, pivotally supported at 15 on the drum so that by being turned on their pivots they may be projected more or less into the material on the floor 20 of the reservoir surrounding the drum.

The said drum is rotated in the direction to cause the projecting ends of the blades to enter the material surrounding the drum, which is mounted upon and keyed to a shaft 30, (see Fig. 2) adapted to be rotated by the bevelled gears 31 from the shaft 32 driven by the sprocket wheel 33 which is the primary actuating device for the entire apparatus and which may itself be driven at varying speeds according to the fuel requirements in any well-known manner.

Assuming the blades 14 of the primary feeding device to be projecting more or less from the wall 12 of the drum, they will in their rotation scoop off the material from above the floor 20 and cause it to be delivered off from said floor into the accumulator 3 as shown in Fig. 2, at the same time fully disintegrating any lumps that there may be in the material in the reservoir, so that it is delivered in the desired fully separated condition into the accumulator, and will have a density at the bottom thereof, due to the packing action from the definite fall from the floor of the reservoir and to the depth to which the material accumulates in the accumulator, and which density will remain substantially constant at the bottom of the accumulator so long as the material is kept at substantially the same depth in the accumulator.

The material thus delivered into the accumulator is discharged therefrom by the dischaging device best shown in Figs. 2 and 8 which as shown in this instance consists of a horizontal wheel 40 at the lower end of the accumulator 3, the lower face of said wheel being just over the bottom 41 of the accumulator, and said wheel having about one-half of its upper face covered by a plate 42, forming the bottom or floor of the accumulator above that half of the wheel.

The marginal part of the wheel 40 is provided with blades 43 the spaces 44 between which constitute pockets or buckets, about one-half of the number of which are at any time below and covered by the plate or upper half-bottom 42 of the accumulator, while the other half of the said buckets are within the chamber above the bottom 41 thereof and are thus in position to have the material from the accumulator enter and fill the same by gravitation.

The said wheel is rotated, preferably in the direction reverse to that of the primary feeding device, by bevel gearing 35, and spur gearing 36, from the main shaft 32 driven by the sprocket wheel 33, and the rate of movement of the discharging device, or number of rotations of the wheel 40, may be kept account of by a set of numbering wheels 37, best shown in Fig. 1, driven from a worm 38 on the hub of the gear 35, or from the shaft 39 of the wheel 40 which as shown in Fig. 2 is hollow, and has the driving shaft 30 of the primary feeding device passing through it.

The bottom 41 of the accumulator 3 does not extend entirely over the lower end of the accumulator 3, but leaves a portion of the bucket periphery of the wheel 40 uncovered below the floor-plate 42 so that when the buckets arrive at this point in the rotation of the wheel, the material which has entered the buckets from the bottom of the accumulator will be discharged therefrom by gravitation, and the apparatus is, as shown in this instance, provided with a rotary brush 50, the flexible periphery of which passes through the buckets as they come around, and thoroughly removes the material therefrom, and also scatters and diffuses it throughout the current of air flowing through the duct 5, 4.

The brush may be made of wire or of fine blades of spring steel which will yield to permit the passage of the bucket separating blades 43, while being very effective for clearing off and scattering and thoroughly separating the fine material carried to it by the said wheel 40.

As the buckets of the wheel 40, have a definite capacity or volume, and the material fills the buckets while passing through the lower end of the accumulator, the said wheel while operating to discharge the material in proper condition into the duct 5, 4, also serves to measure the bulk of the material delivered, so that, together with the provision for keeping account of the movement of the wheel, it constitutes a meter for the material delivered into said duct.

For the proper action of the metering device, the material should be maintained in the accumulator 3 at a depth, which will give the proper density, and in order to maintain such depth the material should be introduced into the accumulator by the primary feeder at the same rate that it is delivered therefrom by the discharging device, whatever the rate of the latter may be, and such maintenance of the desired depth in the accumulator is, in accordance with this invention, effected as follows.

In the construction shown in Figs. 4–7 inclusive, the blades 14 of the primary feeder are provided with wings 16 which when the blades 14 are close in to the drum, project from the side of the drum 12 into the surrounding material and by dragging therethrough tend to throw the blades 14 outward from the periphery of the drum so that they will take a deeper cut into the material and cause it to be fed or delivered more rapidly. The amount of projection of the blades is, however, regulated by a device, herein called the controller, shown as comprising a number of wings or blades 60 projecting from a sleeve or tubular shaft 61 mounted loosely upon the driving shaft 30 of the primary feeder, said blades occupying substantially the entire space radially from the said hollow shaft 61 to the side walls of the accumulator and from the top to the bottom of the latter, said blades terminating at their lower ends slightly above the floor-plate 42 of the accumulator and above the uncovered half of the discharging wheel 40.

The said controller blades 60 are adapted to be engaged as shown at 62 with arms 63 connected with the feeding blades 14 in such manner that turning the controller 60, 61 relative to the drum 10 of the primary feeder, upon the shaft 30 on which shaft said controller is loosely mounted will rock the blades 14 on their pivots 15, and if said turning of the controller is in the direction opposite to that in which shaft 30 and primary feeder normally rotate, it will turn the blades 14 about their pivotal support 15 in the direction to bring them nearer to the drum 12, and this will reduce the amount which they project into the material surrounding the drum, and diminish their rate of feed.

Except for this connection with the blades 14, the controller 60, 61, is free or loose upon the shaft 30, but this connection would naturally cause said controller to rotate in unison with the said shaft and with the drum of the primary feeding device if there were nothing to resist the free rotary movement of the controller.

The resistance of the material in the reservoir 2 to the wings 16, and to the blades 14 themselves will, however, tend to turn said blades outward, and the resulting pivotal movement of the arms 63 will turn the controller 60, 61, about the shaft 30, in the direction of rotation of the latter. If there were no material in the accumulator to resist the turning of the controller on the shaft 30, the blades 14 would naturally be carried to position of maximum extent from the wall 12 of the drum 10 and would thus turn the controller 60, 61, forward to a position in advance of the position shown in Fig. 4.

With the parts in this position, that is, with the blades 14 at their maximum outward projection from the wall 12 of the drum 10, the delivery of the primary feeding device would be much greater than that of the discharging and measuring device, (the driving gearing, which is common to both, being so proportioned as to give such relative rate of delivery) and consequently if the accumulator were empty when the apparatus was first started in operation, the material would rapidly rise therein, as it would be delivered into the accumulator by the primary feeder much faster than it was carried out by the discharging and measuring device.

The rising or accumulating material, however, collecting between the blades of the controller (which would then be rotating in unison with the primary feeding device) would tend to resist the movement of said controller and would cause such resistance to increase as the depth of the material in the accumulator increased.

The resistance of the material in the accumulator to the movement of the blades of the controller would thus tend to cause the latter to rotate more slowly than the shaft 30 of the primary feeder, or in other words to turn backward on said shaft against the resistance of the arms 63, and in so doing the controller would turn the feed blades 14 on their pivots 15, (toward the position shown in dotted lines in Fig. 4) causing them to come nearer the periphery of the drum, so that they project less far into the material, and consequently said blades take the material from the floor of the reservoir around the drum at a less rapid rate. The blades of the controller sweep the accumulating material around in the accumulator, and said material offers more and more resistance to the controller blades as the level of the material rises. The resistance or pressure of the material against the blades 60, is transmitted to the arms 63, of the feed blades 14, and acts to turn said blades on their pivots 15, inward toward the wall 12, of the feed drum, so that said blades act less effectively to feed the material from the reservoir 2, into the accumulator 3. By such action when the material in the accumulator rises to the level which will give the desired density of the material at the point of discharge the action of the primary feeding device becomes just about balanced with that of the discharging and measuring device, 40, so that the desired level in the accumulator is automatically maintained.

As herein shown the lower ends of the controller blades 60 are bevelled or inclined as shown at 65, Fig. 11, and thus act to fill and pack the buckets of the discharging and measuring device, enhancing the uniformity in density of the material when finally contained in the measuring buckets, and insuring the complete filling of the buckets.

The operation is as follows. Assuming the accumulator to be empty at the outset, the rotation of the power shaft 32 will cause the shaft 30 and the primary feed drum 10 to rotate in the clockwise direction as viewed in Figs. 4, 5, and 9, and will cause the discharging wheel 40 to rotate in the opposite direction.

As the accumulator is empty the controller blades 60 will encounter no material resistance and the resistance of the coal in the reservoir 2 acting on the wings 16 and blades 14 will turn the latter on their pivots 15 until said blades project the maximum distance from the drum 10 into the surrounding coal, said pivotal movement of the blades 14 being unresisted by the controller blades 60, which are themselves turned forward a little way on the shaft 30 by said outward movement of the blades 14, the movement being from the dotted line toward the full line position, Fig. 5.

With the blades 14 thus excessively projected they will feed the coal into the accumulator at a much greater rate than that at which it is being discharged from the lower end thereof by the discharging wheel 40. With such excessive feed relative to the discharge rate the coal will rapidly rise in the accumulator between the controller blades 60 and in being carried or swept around in the accumulator chamber by said blades will offer a resistance to their rotation which will increase as the depth of the coal in the accumulator increases. The corresponding increase in pressure of the coal against the blades 60 (tending to force them to turn rearward on the shaft 30) is transmitted by the arms 63 to the feed blades 14 causing the latter to turn on their pivots 15 inward toward the wall 12 of the drum 10, thus diminishing the rate at which said blades feed the coal into the accumulator.

With the several parts properly proportioned, when the coal has risen in the accumulator sufficiently to give the desired density at the discharge wheel 40 its pressure against the blades 60, acting through the arms 63 balances the pressure or resistance of the coal against the wings 16 and blades 14 with the latter in position relative to the drum 10 to feed the coal into the accumulator at the same rate as that of discharge by the wheel 40, so that the level of the coal in the accumulator will remain constant, and the controller will rotate without change of position on the shaft 30, being actuated in its rotary movement by the arms 63 of the feed blades with a force or pressure due to the resistance of the coal in the reservoir 2 to the wings 16 and blades 14, which remains in balance with the pressure against the blades 60, so long as the level of the coal in the accumulator remains unchanged.

A change in the rate of discharge due to the speeding up of the rotation of the discharge wheel 40, would not necessarily call for any adjustment of the blades 14, as the speed of the feed drum would itself be correspondingly increased by the driving gearing common to both, but if, for any reason, the rate of discharge should increase relative to the rate of feed into the accumulator (as for example by the coal lumping in the reservoir 2 and failing to gravitate uniformly to the action of the feed blades 14)

the level of the coal in the accumulator would begin to drop, which would reduce the pressure against the blades 60 until the pressure on the wings 16 and blades 14 overbalanced that on the blades 60 and caused the blades 14 to move outward and increase their action on the coal coming from the reservoir 2. The feed would thus be equalized with the discharge and the fall in level of the coal in the accumulator would be stopped.

On the other hand, if for any reason there should be a reduction in the rate of discharge relative to the rate of feed into the accumulator, the level in the accumulator would begin to rise, the pressure against the controller blades 60 would thus be increased, and overbalancing the pressure against the wings 16 and blades 14 would move the latter inward and thus reduce the feed of said blades to equality with the discharge by the wheel 40.

The proper adjustment or compensation of the feeding action is thus effected before the level in the accumulator departs from normal enough materially to affect the density of the coal at the point of discharge.

The invention is not limited to details of mechanical construction of the apparatus, which may be widely varied and may require some modification if other materials than pulverized coal are to be operated upon.

In the modification shown in Figs. 9 and 10, the blades 14 of the primary feeding device instead of being primarily moved outward by action like that of the wings 16 (or in addition to the action of such wings if desired) are acted upon by springs 160 which tend to throw the blades 14 outward, and will do so to approximately maximum or full extent if there is no resistance to the rotation of the controller 60, 61, in unison with the primary feeding device.

For materials other than coal delivered for fuel the air duct 5, 4, and the brush 50 may be unnecessary, and the measured material may be delivered by falling directly from the buckets of the measuring device as they come out from beneath the accumulator, into a suitable receptacle for the measured material or into any desired duct or conveyor for receiving such material from the feeding and measuring apparatus.

It will be recognized that if a constant rather than a variable delivery were required, the apparatus would be useful for bringing the material to uniform condition so that the uniform volume rate of delivery would also insure substantially uniform delivery by weight.

If no metering were desired, the apparatus would be equally useful in insuring the proper condition of the material and the desired rate of feed, responsive to the rate of movement of the discharging device.

I claim:

1. An apparatus for feeding finely divided material comprising a primary feeder capable of continuously delivering the material from a source of supply at varying rates; an accumulator adapted to receive material from said primary feeder; means for discharging material from the accumulator; and a controller responsive to the material in the accumulator adapted to regulate the rate of delivery of the primary feeder to maintain the volume and density of the material in the accumulator approximately constant.

2. The combination of a primary feeding appliance having movable blades adapted to deliver finely divided material, and an accumulator into which said material is delivered, with means for discharging the material from the accumulator at the desired rate, and a controller subjected to the action of the material in the accumulator, and connected with the blades of the primary feeding appliance.

3. A rotary primary feeding appliance for finely divided material having provision for engaging said material to varying depths to vary the quantity delivered in a given amount of rotary movement, an accumulator for said material, and means for discharging the material therefrom, combined with a controller adapted to rotate substantially in unison with the primary feeding appliance and being acted upon by the material in the accumulator to control the depth to which the material is engaged by the primary feeder.

4. A reservoir for finely divided material, and a cylindrical accumulator below the same, combined with a rotary feeder having movable blades for engaging the material in the reservoir and delivering it therefrom into the accumulator, a rotary discharging wheel at the lower end of the accumulator adapted to discharge the material therefrom at a rate proportional to the speed of rotation of said discharge wheel, and a controller adapted to rotate approximately in unison with the primary feeder, said controller having blades adapted to engage the material in the accumulator, and said blades being connected to the blades of the primary feeder to regulate the position thereof in response to the resistance of the material in the accumulator to the blades of the controller.

5. A reservoir for finely divided material, and a cylindrical accumulator below the same, combined with a feeder composed of a drum over the upper end of the accumulator having blades adapted to be projected varying distances into the material in the reservoir surrounding said drum and to deliver said material into the accumulator, a driving shaft for said drum extending through the accumulator, a controller loosely mounted on said driving shaft in the accumulator, a rotary discharging wheel having measuring buckets around its periphery, actuating means for rotating the feed drum and discharging wheel, and connections between the controller and the blades of the feed drum whereby the latter are projected more or less to maintain the feed delivery into the accumulator substantially equal to the discharge therefrom.

6. The combination of a primary feeding device and means for regulating its rate of delivery automatically, with means for discharging at a measured rate the material delivered by said primary feeder, and means for keeping account of the operation of said discharging means.

7. The combination of a primary feeder for finely divided material and an accumulator into which the material delivered by the primary feeder falls, with a rotary discharging wheel having buckets around its periphery adapted to discharge the material from said accumulator, and a brush adapted to operate in conjunction with said buckets at the place of discharge therefrom.

8. The combination of the primary feeder having variable feeding devices, an accumulator into which the material is delivered therefrom, and a controller co-operating with the variable feeding devices and having blades adapted to engage with the material in the accumulator; with a rotary discharging wheel below the accumulator having buckets around its periphery adapted to receive the material from the accumulator and to discharge it outside of the accumulator, the blades of the controller being adapted to co-operate with the discharge wheel in filling and packing the buckets thereof.

9. The combination with a chamber for containing pulverulent or granular material, of a horizontally disposed discharging wheel at the lower end of said chamber provided with peripheral blades, an inner bottom or floor lying over and covering a portion of the periphery of said discharging wheel, and a lower bottom or closure for said chamber directly below said wheel, having an opening below a portion of the periphery of wheel which is covered by the inner bottom.

ERVIN G. BAILEY.